US009672208B2

(12) United States Patent
Patil

(10) Patent No.: US 9,672,208 B2
(45) Date of Patent: Jun. 6, 2017

(54) AUTOMATIC SELECTION OF LANGUAGE FOR VOICE INTERFACE

(71) Applicant: Bose Corporation, Framingham, MA (US)

(72) Inventor: Naganagouda B. Patil, Ashland, MA (US)

(73) Assignee: Bose Corporation, Framingham, MA (US)

( * ) Notice: Subject to any disclaimer, the term of this patent is extended or adjusted under 35 U.S.C. 154(b) by 156 days.

(21) Appl. No.: 14/193,685

(22) Filed: Feb. 28, 2014

(65) Prior Publication Data
US 2015/0248399 A1 Sep. 3, 2015

(51) Int. Cl.
*G06F 17/20* (2006.01)
*G06F 17/28* (2006.01)
*G06F 3/16* (2006.01)
*H04M 1/725* (2006.01)
*H04W 4/00* (2009.01)
*H04W 4/02* (2009.01)
*H04W 8/22* (2009.01)
*G06F 9/44* (2006.01)

(52) U.S. Cl.
CPC ............. *G06F 17/28* (2013.01); *G06F 3/167* (2013.01); *H04M 1/7253* (2013.01); *H04M 1/72583* (2013.01); *H04W 4/005* (2013.01); *H04W 4/008* (2013.01); *H04W 4/02* (2013.01); *G06F 9/4448* (2013.01); *H04M 1/72572* (2013.01); *H04M 2250/02* (2013.01); *H04M 2250/58* (2013.01); *H04W 8/22* (2013.01)

(58) Field of Classification Search
CPC ... G06F 9/4448; G08C 2201/30; G10L 15/32; H04M 1/72519; H04M 1/72527; H04M 1/72563; H04M 1/72572; H04W 8/22; H04W 8/24; H04W 8/245
See application file for complete search history.

(56) References Cited

U.S. PATENT DOCUMENTS 7,203,486 B2 * 4/2007 Patel ................... H04L 12/2805
340/4.37
7,340,389 B2 * 3/2008 Vargas ................. G06F 9/4448
455/456.3
8,775,157 B2 * 7/2014 Abdel-Kader ........ G06F 17/214
455/418

(Continued)

FOREIGN PATENT DOCUMENTS

EP 2635058 A1 9/2013

OTHER PUBLICATIONS

International Search Report and Written Opinion dated May 22, 2015 for International application No. PCT/US2015/017656.

(Continued)

Primary Examiner — Richard Zhu

(57) ABSTRACT

A wireless device includes a processor, a memory, a wireless interface, and a voice interface. The processor is configured to select a language for the voice interface by detecting a second wireless device, establishing ongoing communications with the second wireless device, identifying a language used by a user interface of the second wireless device, and configuring the voice interface to use the same language as the user interface of the second wireless device.

24 Claims, 2 Drawing Sheets

(56) References Cited

U.S. PATENT DOCUMENTS

| | | | |
|---|---|---|---|
| 9,030,409 B2* | 5/2015 | Kim | G06F 3/002 345/156 |
| 9,049,557 B2* | 6/2015 | Yu | H04M 1/72572 |
| 9,106,721 B2* | 8/2015 | Quan | G06F 17/30085 |
| 2005/0131685 A1* | 6/2005 | Roth | G10L 15/005 704/231 |
| 2006/0184356 A1* | 8/2006 | Kim | G06F 9/4448 704/8 |
| 2007/0073530 A1* | 3/2007 | Iso-Sipila | G06F 9/4448 704/3 |
| 2007/0124675 A1* | 5/2007 | Ban | G06F 9/4448 715/703 |
| 2009/0178010 A1* | 7/2009 | Chaudhri | G06F 9/4448 715/863 |
| 2009/0279532 A1* | 11/2009 | Perna | H04M 3/22 370/352 |
| 2009/0325630 A1* | 12/2009 | Tiitola | G06F 9/44505 455/550.1 |
| 2010/0169074 A1* | 7/2010 | Hung | G06F 17/243 704/8 |
| 2010/0267376 A1* | 10/2010 | Saari | G06F 8/38 455/418 |
| 2013/0162523 A1* | 6/2013 | Tomaszewski | G06F 3/1454 345/156 |
| 2014/0317523 A1* | 10/2014 | Wantland | H04L 67/22 715/744 |
| 2015/0220512 A1* | 8/2015 | Heinemeyer | G10L 15/005 704/2 |

OTHER PUBLICATIONS

"User guide SmartWatch 2 SW2", 1-3, 5-13, Jul. 31, 2013 (Jul. 31, 2013), pp. 1-18, 15-23 XP055188454, Retrieved from the Internet: URL:http://data.manualslib.com/pdf3/58/5712/571145-sony/sw2.pdf?f2608d9182230308a674a77f717147dO [retrieved on May 11, 2015].

* cited by examiner

AUTOMATIC SELECTION OF LANGUAGE FOR VOICE INTERFACE

BACKGROUND

The present invention relates to user interface technology, and more specifically to automatic selection of a language for a voice interface.

A voice interface uses speech to interact with a user of an electronic device or service. In general, a voice interface may work in one or both of two directions. A text-to-speech interface converts textual data to spoken words to provide verbal output to the user. A voice recognition interface converts the user's spoken input into instructions usable by the electronics.

In general, Bluetooth® wireless technology is a wireless communications system intended to replace the cables connecting electronic devices. In order for two devices to communicate over Bluetooth, they must first be paired. A pairing sequence between two Bluetooth devices typically requires user setup actions on both devices and time for the Bluetooth devices to discover each other. Devices may be connected for various purposes, including remote control, exchange of data, or playback of audio signals generated by one device on a speaker in another device. In the context of this application, when we refer to "Bluetooth" we are referring to protocols and connections operating according to the version of the Bluetooth specification released by the Bluetooth Special Interest Group (Bluetooth SIG) as of the filing date of this application, which is Version 4.0 [Vol 0], 30 Jun. 2010. Other wireless technologies may provide similar features and capabilities and may be used in the same manner.

SUMMARY

The following presents a simplified summary in order to provide a basic understanding of some aspects of the invention. This summary is intended to neither identify key or critical elements of the invention nor delineate the scope of the invention. Its sole purpose is to present some concepts of the invention in a simplified form as a prelude to the more detailed description that is presented later.

In general, in one aspect, a wireless device includes a processor, a memory, a wireless interface, and a voice interface. The processor is configured to select a language for the voice interface by detecting a second wireless device, establishing ongoing communications with the second wireless device, identifying a language used by a user interface of the second wireless device, and configuring the voice interface to use the same language as the user interface of the second wireless device.

Implementations may include one or more of the following, in any combination. The processor may identify the language used by the user interface of the second wireless device by transmitting to the second wireless device a query requesting the identification of the language, and receiving a response identifying the language. The processor may identify the language used by the user interface of the second wireless device by receiving an identification of the language as part of establishing ongoing communications. The processor may identify the language used by the user interface of the second wireless device by receiving geographic information from the second wireless device, and selecting a language corresponding to the geographic information. The processor may be configured to output, via the speaker, an identification of the identified language, and receive through a user interface instructions to configure a different language for use by the voice interface. The wireless interface includes a Bluetooth wireless interface. The processor may configure the voice interface by loading a language library from the memory. The processor may configure the voice interface by receiving a language library from the second wireless device. The processor may configure the voice interface by receiving a language library from a remote server. The processor may receive the language library from the remote server using the wireless interface to access a network interface of the second wireless device.

In general, in one aspect, a system includes a first wireless device with a first processor, a first memory, a first wireless interface, and a voice interface, and a second wireless device with a second processor, a second memory, a second wireless interface, and a user interface. The first processor is configured to select a language for the voice interface by detecting the second wireless device, establishing ongoing communications with the second wireless device, identifying a language used by the user interface of the second wireless device, and configuring the voice interface to use the same language as the user interface of the second wireless device. The first processor transmits to the second wireless device a query requesting the identification of the language, the second processor receives the query and transmits to the first wireless device an identification of the language, and the first processor receives the identification.

Implementations may include one or more of the following, in any combination. The second memory may include a language library corresponding to the language used by the user interface of the second wireless device, the second wireless device providing the language library to the first wireless device, and the first processor configuring the voice interface using the language library from the second wireless device. The second wireless device may include a navigation system, the second wireless device providing geographic information from the navigation system to the first wireless device, and the first processor using the geographic information to identify the language used by the user interface of the second wireless device.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

An increasingly common feature in consumer electronic products is a voice interface. A voice interface allows a user to interact with the electronics through the spoken word—by speaking instructions to be used as input, and by having the device provide its output as spoken language. Some devices provide only one or the other of these features—speaking output, but not accepting voice input, or vice-versa. For a consumer product targeting a large population, it may be desirable to include more than one language in the product's voice interface, so that a user can speak or hear his preferred language. When the product has no other interface, e.g., no graphical user interface, a challenge in such a product is how to initially select the language to use for the voice interface, given that users may not understand instructions given in a default language that explain how to select a different language. Even if they understand the instructions, the limited physical interfaces provided by some products may make it difficult to select a language from a large inventory of choices.

Figure 1:
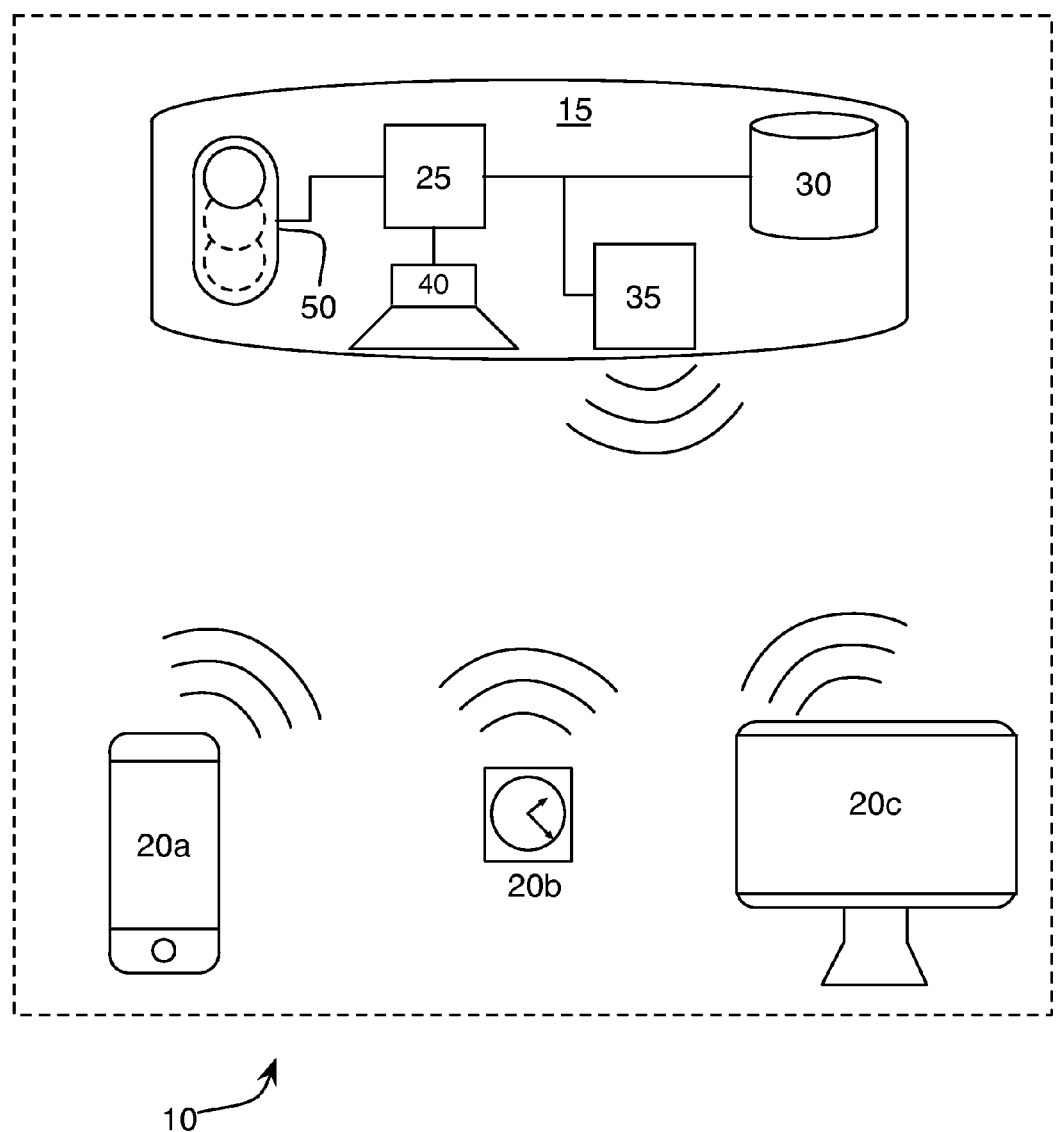
FIG. 1 is a block diagram of an exemplary wireless entertainment system.

As shown in FIG. 1, an exemplary wireless entertainment system 10 includes a wireless playback device 15 and one or more wireless audio sources 20a, 20b and 20c. Example wireless playback devices include, but are not limited to, a headset, a portable speaker, an automobile entertainment system, a home theater system, and so forth. Example wireless audio sources 20a, 20b, 20c include, but are not limited to, an entertainment system, a communication system, a personal computer, a smart watch, and so forth. In some examples, Bluetooth wireless technology is used to provide wireless communication between the components of the system. Although FIG. 1 shows audio sources and a playback device, the interfaces described below are applicable to other types of devices, such as network access points, health monitors, and similar devices. In general, we will refer to the device 15 that is the primary subject of this disclosure as an output device, and the device to which is paired as a source device, but both of these roles may be reversed or entirely different in a given system.

In some examples, the output device 15 includes a processor 25, a memory 30, a wireless communication module 35, and a speaker 40. The wireless communication module may include, for example, a Bluetooth wireless communication interface or other similar interface. The output device may also include some form of physical user interface 50, ranging from simple switches and lights to fully interactive touchscreen displays, though the system described herein is generally most valuable when other interfaces are limited.

The processor 25 controls the general operation of the output device. In some examples, where Bluetooth or a similar wireless technology is used, the processor 25 initiates a Bluetooth-specific function implemented in the wireless module 35 upon detecting certain events, as described below. The processor 25 initiates an operation (e.g., pairing) necessary to establish communication between the output device 15 and the one or more wireless audio sources 20a, 20b, 20c using Bluetooth wireless technology.

The memory 30 may include any suitable memory technology, such as Read Only Memory (ROM), Random Access Memory (RAM), or flash ROM, to name a few examples. Among other things, the memory stores a microcode of a program for processing and controlling the processor 25 and a variety of reference data, data generated during execution of any of the variety of programs performed by the processor 25, and various updateable data for safekeeping such as a phone book, outgoing messages, incoming messages and the like. Different types of data may be stored in different types of memory. The memory includes executable code for general operation of the wireless playback device, including the voice user interface In particular, the memory may include libraries of words, phoneme-to-letter mappings, and grammar, spelling and pronunciation rules for multiple languages. The memory also includes executable code for selecting one of the stored languages to use in the voice interface.

The wireless module 35 enables a wireless connection using Radio Frequency (RF) communication between the wireless playback device 15 and the wireless audio sources 20a, 20b, 20c. The wireless module 35 exchanges a radio signal including data input/output through an antenna (not shown). For example, when using Bluetooth wireless technology in a transmission mode, the wireless module 35 processes data by channel coding and spreading, converts the processed data into a Radio Frequency (RF) signal and transmits the RF signal. In a reception mode, the wireless module 35 converts a received RF signal into a baseband signal, processes the baseband signal by de-spreading and channel decoding and restores the processed signal to data.

Each of the source devices, audio source 20a for example, can include a processor, a memory, and a wireless communication module implementing Bluetooth or other appropriate wireless technology. The particular construction and technology of the source devices is not within the scope of this disclosure, except to note that wireless communication module is compatible with the wireless module 35 of the output device 15, such that it interacts with the output device in the manner described below. In some examples, the voice interface code and language libraries are contained within one of the connected source devices and available for use by the output device, or are provided by an on-line service that the output device can connect to through one of the source devices which is also connected to a wide-area network.

Figure 2:
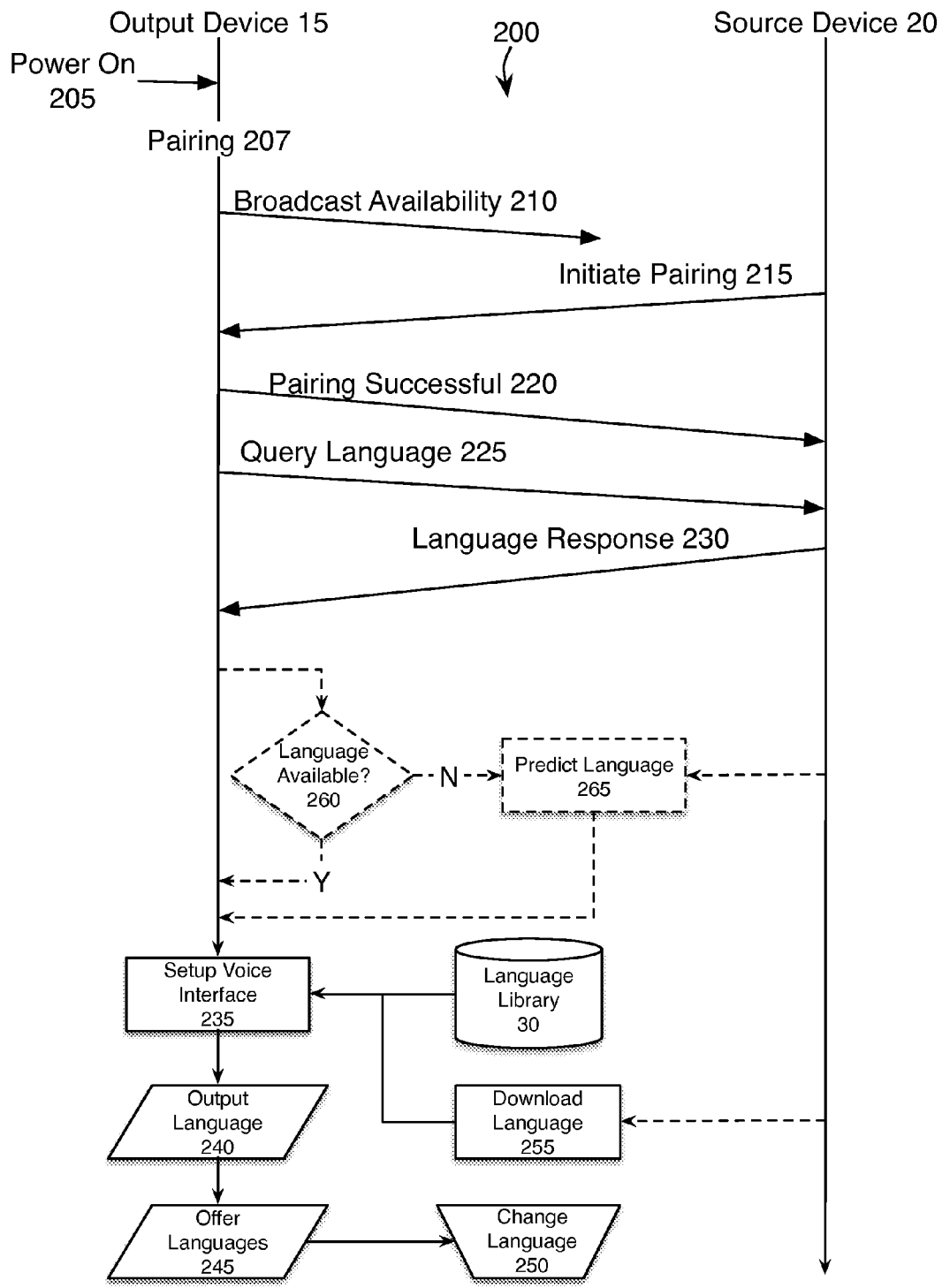
FIG. 2 is a flow diagram.

As shown in FIG. 2, a process 200 is performed by the output device 15 in communication with the source device 20 to automatically select a language for the voice interface. The process 200 begins when the output device is powered on (205). The output device then enters a pairing state (207), in which it broadcasts (210) that it is available for pairing, and waits for a source device 20 to respond to the broadcast by initiating pairing (215). In general, a source device will respond to the broadcast when instructed to do so by its user, e.g., as part of a pairing process within the source device's user interface. When a source device responds to the pairing broadcast, it will provide several pieces of information, including, for example, its name and the address it uses in the wireless protocol used by the two devices. In response to that, the output device confirms (220) that the pairing was successful and queries (225) the source device about what language it is using for its own interface. For the operation of process 200, it is assumed that the source device itself has a user interface that includes multiple languages, whether text-based or voice-based. The source devices replies (230) to the query with an identification of its language.

The output device sets (235) its own voice interface to use the same language, for example by loading a language library from the memory 30. In some examples, the output device then outputs (240) an audible indication of what language was selected, and offers (245) to let the user change it (250), initially using the automatically selected language to provide an interface for this. While the user may not want the output device to use the same language as the source device, for example, if the source device does not actually offer the user's preferred language, it may be assumed that the user will at least understand the language that the source device is using well enough to then use that language in the voice interface of the output device to select his preferred language.

In another example, the output device may not have the required language pre-installed. In this case, once it learns what language the source device is using, it downloads (255) the appropriate language, either from the source device itself, or using a network interface (internal or within the source device) to obtain the language resources from an on-line source. Especially if the availability of a network is highly likely, the output device may ship with few languages installed (saving on memory resources), and rely on the network to get whatever language it needs.

If the source device does not know or cannot communicate what language it is using, shown by optional branch point 260, other data within the source device may be used (265) to make a guess about what language should be used. For example, if the source device has access to and can share global positioning system (GPS) or other navigation data, the output device can select the majority language for the region where the devices are located. Similarly, the radio frequencies supported by any wireless interfaces in the source device may allow the output device to make an educated guess about its geographic location and therefore the likely language preference of its user.

The direct selection of audio source process 200 is illustrated in the context of the BLUETOOTH SPECIFICATION Version 4.0 [Vol 0], 30 Jun. 2010. However, it should be understood that the approach described above is equally applicable to other wireless protocols.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. Accordingly, other implementations are within the scope of the following claims.

What is claimed is:

1. A method comprising, in a wireless headset comprising at least a processor, a memory, a speaker, a wireless interface, and a voice interface:
   detecting a wireless audio source device;
   establishing ongoing communications with the wireless audio source device;
   identifying a suggested language for the voice interface by receiving geographic information from the wireless audio source device, wherein the suggested language is based on the geographic information;
   configuring the voice interface of the wireless headset to provide the voice interface in the suggested language by receiving a language library for the suggested language from a remote server by using the wireless interface to access a network interface of the wireless audio source device, and using the network interface of the wireless audio source device to download the language library from the remote server;
   outputting, via the speaker, an identification of the suggested language used to configure the voice interface; and
   making available to the user an option to configure a different language for use by the voice interface.

2. The method of claim 1 wherein identifying the suggested language for the voice interface comprises transmitting to the wireless audio source device a query requesting the geographic information, and receiving a response identifying the geographic information.

3. The method of claim 2 wherein identifying the geographic information comprises receiving an identification of the geographic information as part of establishing ongoing communications.

4. The method of claim 1 wherein the wireless interface comprises a Bluetooth wireless interface.

5. The method of claim 1 wherein configuring the voice interface comprises loading the language library from the memory.

6. The method of claim 1 wherein configuring the voice interface comprises receiving the language library from the wireless audio source device.

7. The method of claim 1, further comprising determining a location of the wireless audio source device based on the geographic information.

8. The method of claim 7, wherein the suggested language is the majority language for the location of the wireless audio source device.

9. The method of claim 1, wherein the geographic information is based on at least one of: data from a global positioning system (GPS) in the wireless audio source device and a radio frequency supported by the wireless audio source device.

10. A wireless headset comprising:
    a processor,
    a memory,
    a speaker,
    a wireless interface, and
    a voice interface, wherein
    the processor is configured to select a language for the voice interface by:
      detecting a wireless audio source device;
      establishing ongoing communications with the wireless audio source device;
      identifying a suggested language for the voice interface by receiving geographic information from the wireless audio source device, wherein the suggested language is based on the geographic information;
      configuring the voice interface to use the suggested language by receiving a language library for the suggested language from a remote server by using the wireless interface to access a network interface of the wireless audio source device, and using the network interface of the wireless audio source device to download the language library from the remote server;
      outputting, via the speaker, an identification of the suggested language used to configure the voice interface; and
      making available to the user an option to configure a different language for use by the voice interface.

11. The wireless headset of claim 10 wherein the processor identifies the suggested language for the voice interface by transmitting to the wireless audio source device a query requesting the geographic information, and receiving a response identifying the geographic information.

12. The wireless headset of claim 11 wherein the processor identifies the geographic information by receiving an identification of the geographic information as part of establishing ongoing communications.

13. The wireless headset of claim 10 wherein the wireless interface comprises a Bluetooth wireless interface.

14. The wireless headset of claim 10 wherein the processor configures the voice interface by loading the language library from the memory.

15. The wireless headset of claim 10 wherein the processor configures the voice interface by receiving the language library from the wireless audio source device.

16. The wireless headset of claim 10, wherein the processor is further configured to determine a location of the wireless audio source device based on the geographic information.

17. The wireless headset of claim 16, wherein the suggested language is the majority language of the location of the wireless audio source device.

18. The wireless headset of claim 10, wherein the geographic information is based on at least one of: data from a global positioning system (GPS) in the wireless audio source device and a radio frequency supported by the wireless audio source device.

19. A system comprising:
a wireless headset comprising
a first processor,
a first memory,
a first speaker,
a first wireless interface, and
a voice interface; and
a wireless audio source device comprising
a second processor,
a second memory,
a second wireless interface, and
a user interface; wherein
the first processor is configured to select a language for the voice interface by:
detecting the wireless audio source device;
establishing ongoing communications with the wireless audio source device;
identifying a suggested language for the voice interface by receiving geographic information from the wireless audio source device, wherein the suggested language is based on the geographic information;
configuring the voice interface to use the suggested language by receiving a language library for the suggested language from a remote server by using the wireless interface to access a network interface of the wireless audio source device, and using the network interface of the wireless audio source device to download the language library from the remote server;
outputting, via the first speaker, an identification of the suggested language used to configure the voice interface; and
making available to the user an option to configure a different language for use by the voice interface.

20. The system of claim 19 wherein:
the first processor transmits to the wireless audio source device a query requesting the identification of the geographic information,
the second processor receives the query and transmits to the wireless headset an identification of the geographic information, and
the first processor receives the identification.

21. The system of claim 19 wherein:
the wireless audio source device includes a navigation system;
the wireless audio source device provides geographic information from the navigation system to the wireless headset; and
the first processor uses the geographic information to identify the suggested language.

22. The system of claim 19 wherein the first processor configures the voice interface by loading the language library from the first memory.

23. The system of claim 19, wherein the first processor configures the voice interface by receiving the language library from the wireless audio source device.

24. The wireless headset of claim 19, wherein the first processor is further configured to determine a location of the wireless audio source device based on the geographic information, and the suggested language is the majority language for the location of the wireless audio source device.

* * * * *